(12) United States Patent
Deng

(10) Patent No.: US 8,239,912 B2
(45) Date of Patent: Aug. 7, 2012

(54) WIRELESS NETWORK BASE STATIONS CAPABLE OF RECEIVING VIDEO SIGNALS

(75) Inventor: Ten-Long Deng, ZhuDng Township, Hsinchu County (TW)

(73) Assignee: Asustek Computer Inc., Taipei (TW)

( * ) Notice: Subject to any disclaimer, the term of this patent is extended or adjusted under 35 U.S.C. 154(b) by 1434 days.

(21) Appl. No.: 11/299,538

(22) Filed: Dec. 12, 2005

(65) Prior Publication Data

US 2006/0159070 A1 Jul. 20, 2006

(30) Foreign Application Priority Data

Jan. 20, 2005 (TW) ............................... 94101650 A

(51) Int. Cl.
*H04N 7/16* (2011.01)
(52) U.S. Cl. ........ 725/133; 725/141; 725/153; 725/121; 725/126
(58) Field of Classification Search .................. None
See application file for complete search history.

(56) References Cited

U.S. PATENT DOCUMENTS

| | | | | |
|---|---|---|---|---|
| 5,318,450 A * | 6/1994 | Carver | ........................... | 434/336 |
| 6,028,984 A * | 2/2000 | Kimball | ........................ | 709/249 |
| 2002/0026645 A1* | 2/2002 | Son et al. | ...................... | 725/117 |
| 2003/0140343 A1* | 7/2003 | Falvo et al. | ..................... | 725/51 |
| 2003/0145334 A1* | 7/2003 | Motoe et al. | ................... | 725/123 |
| 2004/0031056 A1* | 2/2004 | Wolff | .............................. | 725/110 |
| 2004/0068753 A1* | 4/2004 | Robertson et al. | ............ | 725/126 |
| 2005/0278755 A1* | 12/2005 | Kuo et al. | ........................ | 725/80 |
| 2006/0143662 A1* | 6/2006 | Easterling et al. | .............. | 725/76 |

FOREIGN PATENT DOCUMENTS

JP 2004222136 8/2004

OTHER PUBLICATIONS

CN Office Action mailed Feb. 15, 2008.

* cited by examiner

*Primary Examiner* — Dominic D Saltarelli
*Assistant Examiner* — Jason J Chung
(74) *Attorney, Agent, or Firm* — Thomas|Kayden

(57) ABSTRACT

Wireless network base stations capable of receiving video signals are provided. A wireless network base station includes a video signal receiver, a video decoding unit, a first Ethernet port, and a processor. The video signal receiver receives a video signal. The video decoding unit connected to the video signal receiver decodes the video signal. The first Ethernet port connected to a network receives first data packets therefrom and transmits second data packets thereto. The processor, connected to the video decoding unit and the first Ethernet port, converts the decoded video signal to video packets and controls reception and transmission of the video packets, the first data packets, and the second data packets. The processor transmits the video packets and the first data packets to a computer and receives the second data packets from the computer wirelessly.

5 Claims, 1 Drawing Sheet

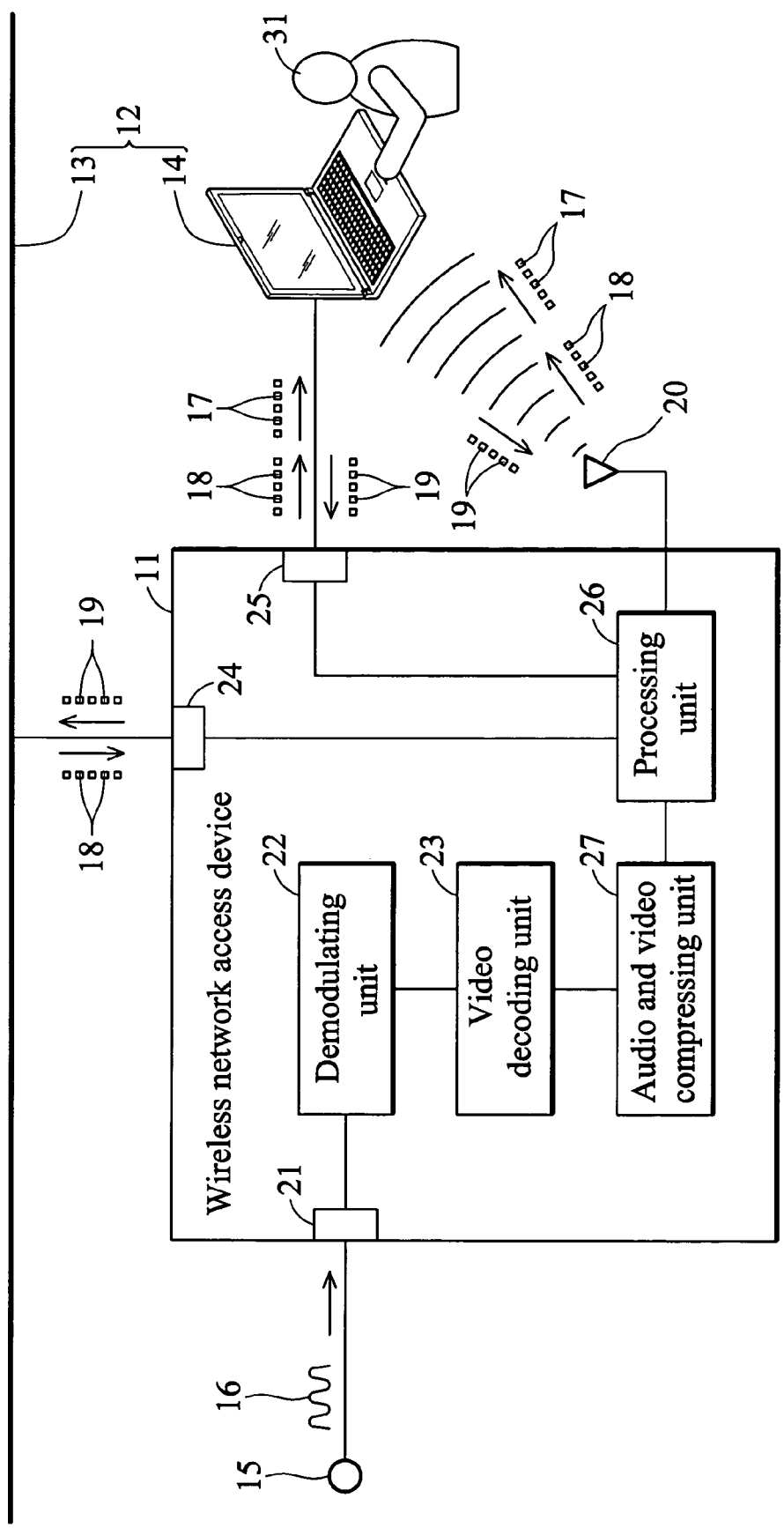

WIRELESS NETWORK BASE STATIONS CAPABLE OF RECEIVING VIDEO SIGNALS

BACKGROUND

The invention relates to wireless network base stations, and in particular, to wireless network base stations capable of receiving video signals.

A wireless network base station, also known as access point (AP), is a commonly used electronic device. A user can access the Internet wirelessly on a computer through a wireless network base station everywhere at anytime in a given area.

Typically, a wireless network base station provides a wireless the Internet access function. However, when a user needs to use another electronic device, such as a television, and browse the Internet simultaneously, the user must move to the electronic device.

Besides inconvenience, the limitation that the user must stay close to another electronic device violates the principle of accessing the Internet wirelessly everywhere at anytime via a wireless network base station.

SUMMARY

Wireless network base stations capable of receiving video signals are provided. An exemplary embodiment of a wireless network base station comprises a video signal receiver, a video decoding unit, a first Ethernet port, and a processor. The wireless network base station is applied in a wireless network system comprising an network and an electrical device. The video signal receiver receives a video signal. The video decoding unit is connected to the video signal receiver for decoding the video signal. The first Ethernet port is connected to the network for receiving a plurality of first data packets therefrom and transmitting a plurality of second data packets thereto. The processor is connected to the video decoding unit and the first Ethernet port. The processor converts the decoded video signal to a plurality of video packets and controls reception and transmission of the video packets, the first data packets, and the second data packets. The processor transmits the video packets and the first data packets to the electrical device and receives the second data packets from the electrical device wirelessly.

DESCRIPTION OF THE DRAWINGS

Wireless network base stations can be more fully understood by reading the subsequent detailed description and examples with references made to the accompanying drawing, wherein:

FIG. 1 is a diagram of an embodiment of a wireless network base station.

DETAILED DESCRIPTION

Wireless network base stations will be described in greater detail in the following.

A principle objective of the embodiment of the invention is to enhance a wireless network base station, commonly known as access point (AP), by providing an image processing function. Thus, a user can watch a video program and browse the Internet simultaneously through the wireless network base station everywhere at anytime in a given area.

FIG. 1 is a diagram of an embodiment of a wireless network base station 11. As shown in FIG. 1, the wireless network base station 11 is applied in a wireless network system 12 and capable of receiving video signals and accessing the Internet data simultaneously.

The wireless network system 12 comprises an network 13 and a notebook computer 14. The wireless network base station 11 comprises a video signal receiver 21, a demodulating unit 22, a video decoding unit 23, a first Ethernet port 24, a second Ethernet port 25, a processor 26, and an audio and video compressor 27.

The wireless network base station 11 receives a video signal 16 of a video signal source 15 through the video signal receiver 21. According to different formats of the video signal 16, the video signal receiver 21 can be a coaxial cable terminal, an S-video terminal, or an A/V terminal.

For example, the video signal 16 is a NTSC TV signal. Note that the video signal receiver 21 can be connected to various audio and video devices, such as a television, a DVD player, and so on, by being a coaxial cable terminal, an S-video terminal, or an A/V terminal, thus enhancing variety of potential sources.

The demodulating unit 22 is connected between the video signal receiver 21 and the video decoding unit 23 for demodulating the video signal 16 transmitted from the video signal receiver 21.

The video decoding unit 23 is connected to the demodulating unit 22 to convert the transmitted video signal 16 from analog format to digital format. The video decoding unit 23 is an analog-to-digital converter (ADC).

Note that the video decoding unit 23 can be directly connected to the video signal receiver 21 in some embodiments of a wireless network base station (not shown in the drawing). In such a case, the video decoding unit 23 directly decodes the video signal 16 transmitted from the video signal receiver 21.

The audio and video compressor 27 is connected between the video decoding unit 23 and the processor 26 for compressing the digital video signal transmitted from the video decoding unit 23 using MPEG technology and further transmitting the compressed video signal to the processor 26.

The processor 26 is connected to the audio and video compressor 27, converting the compressed video signal to a plurality of video packets 17. Moreover, the processor 26 is connected to the first Ethernet port 24. The first Ethernet port 24 is a RJ45 port. The wireless network base station 11 is connected to the network 13 through the first Ethernet port 24. Thus, the wireless network base station 11 can receive a plurality of first data packets 18 from the network 13 or transmit a plurality of second data packets 19 thereto.

As the processor 26 is connected to the first Ethernet port 24, the processor 26 can control reception and transmission of the first and second data packets 18, 19 between the wireless network base station 11 and the network 13, such as monitoring flow volume and quality of the first and second data packets 18, 19 therebetween.

Finally, the wireless network base station 11 can share the video packets 17, first data packets 18, and second data packets 19 with the notebook computer 14 through wireless or wired communication.

When the wireless network base station 11 utilizes wireless communication, the processor 26 transmits video packets 17 to the notebook computer 14 wirelessly through an antenna 20 using streaming technology according to TCP/IP protocol commonly applied on the Internet. A user 31 of the notebook computer 14 can receive the video signal 16 transmitted from the video signal source 15 through the wireless network base station 11, thus enabling the user 31 to watch TV on the notebook computer 14. Moreover, the processor 26 transmits the first data packets 18 to the notebook computer 14 or receives the second data packets 19 therefrom wirelessly via the antenna 20. The user 31 of the notebook computer 14 can receive or transmit the first and second data packets 18, 19 via the wireless network base station 11, thus enabling the user 31 to access the Internet on the notebook computer 14. Note that the antenna 20 receives and transmits video packets 17, first data packets 18, and second data packets 19 according to the IEEE 802.11x standard.

When the wireless network base station 11 utilizes wired communication, the processor 26 transmits the video packets 17 and the first data packets 18 to the notebook computer 14 or receives the second data packets 19 therefrom via the second Ethernet port 25 according to TCP/IP protocol commonly applied on the Internet. Thus, the user 31 of the notebook computer 14 can also watch TV and browse the Internet simultaneously. The second Ethernet port 25 herein is a RJ45 port.

As previously described, after the notebook computer 14 is connected to the wireless network base station 11 via wireless or wired communication, the user 31 can watch TV and browse the Internet simultaneously. Particularly, when the notebook computer 14 is connected to the wireless network base station 11 wirelessly, the user 31 can watch TV and browse the Internet wirelessly on the notebook computer 14 via the wireless network base station 11 everywhere at anytime in a given area, thus avoiding the inconvenience of staying close to a television.

An embodiment of a wireless network base station is enhanced with an image processing function. Thus, a user can watch a video program and browse the Internet simultaneously via a single device everywhere at anytime in a given area, which is convenient and flexible.

While the invention has been described by way of example and in terms of the preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A wireless network base station for a wireless network system including a network and an electrical device, comprising:
    a video signal receiver for receiving a video signal;
    a video decoding unit connected to the video signal receiver for decoding the video signal;
    a demodulating unit connected directly between the video signal receiver and the video decoding unit, demodulating the video signal from the video signal receiver;
    a first Ethernet port connected to the network for receiving a plurality of first data packets therefrom and transmitting a plurality of second data packets thereto, wherein the first Ethernet port is a RJ45 port;
    a processor connected to the video decoding unit and connected directly to the first Ethernet port for converting the decoded video signal to a plurality of video packets, and controlling reception and transmission of the video packets, the first data packets, and the second data packets;
    a second Ethernet port connected directly to the processor for transmitting the video packets and the first data packets to the electrical device and receiving the second data packets from the electrical device, wherein the second Ethernet port is a RJ45 port;
    wherein the processor transmits the video packets and the first data packets to the electrical device using streaming technology according to TCP/IP protocol and receives the second data packets from the electrical device optionally by wireless communication or by wired communication directly through the second Ethernet port; and
    an audio and video compressor connected directly between the video decoding unit and the processor for compressing the decoded video signal and transmitting the compressed video signal to the processor.

2. The wireless network base station as claimed in claim 1, wherein the audio and video compressor compresses the decoded video signal using MPEG technology.

3. The wireless network base station as claimed in claim 1, wherein the video signal receiver comprises a coaxial cable terminal, an S-video terminal, or an A/V terminal.

4. The wireless network base station as claimed in claim 1, wherein the video decoding unit is an analog-to-digital converter (ADC).

5. The wireless network base station as claimed in claim 1, wherein the processor transmits the video packets and the first data packets to the electrical device and receives the second data packets from the electrical device through an antenna according to IEEE 802.11x standard.

* * * * *